(12) United States Patent
Roy et al.

(10) Patent No.: US 12,181,736 B2
(45) Date of Patent: *Dec. 31, 2024

(54) NANOSTRUCTURES FOR OPTICAL DEVICES

(71) Applicant: Applied Materials, Inc., Santa Clara, CA (US)

(72) Inventors: Tapashree Roy, Bangalore (IN); Wayne McMillan, San Jose, CA (US); Rutger Meyer Timmerman Thijssen, Sunnyvale, CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/977,376

(22) Filed: Oct. 31, 2022

(65) Prior Publication Data

US 2023/0056086 A1 Feb. 23, 2023

Related U.S. Application Data

(63) Continuation of application No. 16/601,006, filed on Oct. 14, 2019, now Pat. No. 11,487,139.

(Continued)

(51) Int. Cl.
*G02F 1/01* (2006.01)
*B82Y 20/00* (2011.01)

(52) U.S. Cl.
CPC ............ *G02F 1/0102* (2013.01); *B82Y 20/00* (2013.01)

(58) Field of Classification Search
CPC .............................. G02F 1/0102; B82Y 20/00
(Continued)

(56) References Cited

U.S. PATENT DOCUMENTS 8,879,158 B2 11/2014 Choi et al.
8,976,359 B2 3/2015 Guo
(Continued)

FOREIGN PATENT DOCUMENTS

CN 107272212 A 10/2017
CN 107340559 A 11/2017
(Continued)

OTHER PUBLICATIONS

Taiwan Office Action for Application No. 108140896 dated Mar. 30, 2023.

(Continued)

*Primary Examiner* — William Choi
(74) *Attorney, Agent, or Firm* — Patterson + Sheridan, LLP

(57) ABSTRACT

Embodiments of metasurfaces having nanostructures with desired geometric profiles and configurations are provided in the present disclosure. In one embodiment, a metasurface includes a nanostructure formed on a substrate, wherein the nanostructure is cuboidal or cylindrical in shape. In another embodiment, a metasurface includes a plurality of nanostructures on a substrate, wherein each of the nanostructures has a gap greater than 35 nm spaced apart from each other. In yet another embodiment, a metasurface includes a plurality of nanostructures on a substrate, wherein the nanostructures are fabricated from at least one of $TiO_2$, silicon nitride, or amorphous silicon, or GaN or aluminum zinc oxide or any material with refractive index greater than 1.8, and absorption coefficient smaller than 0.001, the substrate is transparent with absorption coefficient smaller than 0.001.

19 Claims, 4 Drawing Sheets

Related U.S. Application Data

(60) Provisional application No. 62/771,952, filed on Nov. 27, 2018.

(58) Field of Classification Search
USPC .................................................. 359/237, 238
See application file for complete search history.

(56) References Cited

U.S. PATENT DOCUMENTS

| | | | |
|---|---|---|---|
| 9,007,575 | B2 | 4/2015 | Chou et al. |
| 9,207,363 | B2 | 12/2015 | Stoia et al. |
| 9,547,185 | B2 | 1/2017 | Chen et al. |
| 11,487,139 | B2 * | 11/2022 | Roy ........................ B82Y 20/00 |
| 2006/0087758 | A1 * | 4/2006 | Imada .................... B82Y 10/00 360/48 |
| 2010/0259823 | A1 | 10/2010 | Xi et al. |
| 2017/0023803 | A1 | 1/2017 | Han et al. |
| 2017/0030773 | A1 | 2/2017 | Han et al. |
| 2017/0287151 | A1 | 10/2017 | Han et al. |
| 2018/0039102 | A1 | 2/2018 | Baik et al. |
| 2018/0237291 | A1 | 8/2018 | Diao et al. |
| 2018/0246262 | A1 | 8/2018 | Zhan et al. |
| 2018/0322645 | A1 | 11/2018 | Han et al. |

FOREIGN PATENT DOCUMENTS

| | | |
|---|---|---|
| JP | 2005084485 A | 3/2005 |
| JP | 2013505479 A | 2/2013 |
| JP | 2018527629 A | 9/2018 |
| KR | 20090118310 A | 11/2009 |
| KR | 101432115 B1 | 8/2014 |
| KR | 20180015489 A | 2/2018 |

OTHER PUBLICATIONS

Yue, Wenjing et al., "Highly reflective subtractive color filters capitalizing on a silicon metasurface integrated with nanostructured aluminum mirrors", Laser & Photonics Reviews, 2017, pp. 1-8.

Gu, Yinghong et al., "Color generation via subwavelength plasmonic nanostructures", Nanoscale, 2015, pp. 1-11.

Korean Office Action dated Aug. 3, 2023 for Application No. 10-2021-7019339.

International Search Report and Written Opinion for Application No. PCT/US2019/056434 dated Feb. 5, 2020.

European Search Report for Application No. 19891588.6 dated Jul. 22, 2022.

Chinese Office Action dated Nov. 25, 2023 for Application No. 201980076789.X.

Ozer, Ahmet et al. "Vortex beam generation using all dielectric metasurface," Proceedings of the SPIE, vol. 10719, 107192, Sep. 19, 2018, pp. 1-5, DOI: 10.1117/12.2320468.

Japanese Office Action dated Jan. 23, 2024 for Application No. 2021-528336.

Korean Office Action dated Mar. 4, 2024 for Application No. 10-2021-7019339.

European Office Action dated Jul. 15, 2024 for Application No. 19891588.6.

Chinese Office Action dated Mar. 26, 2024 for Application No. 201980076789.X.

Chinese Office Action dated Jul. 1, 2024 for Application No. 201980076789.X.

Japanese Office Action dated Jul. 30, 2024 for Application No. 2021-528336.

* cited by examiner

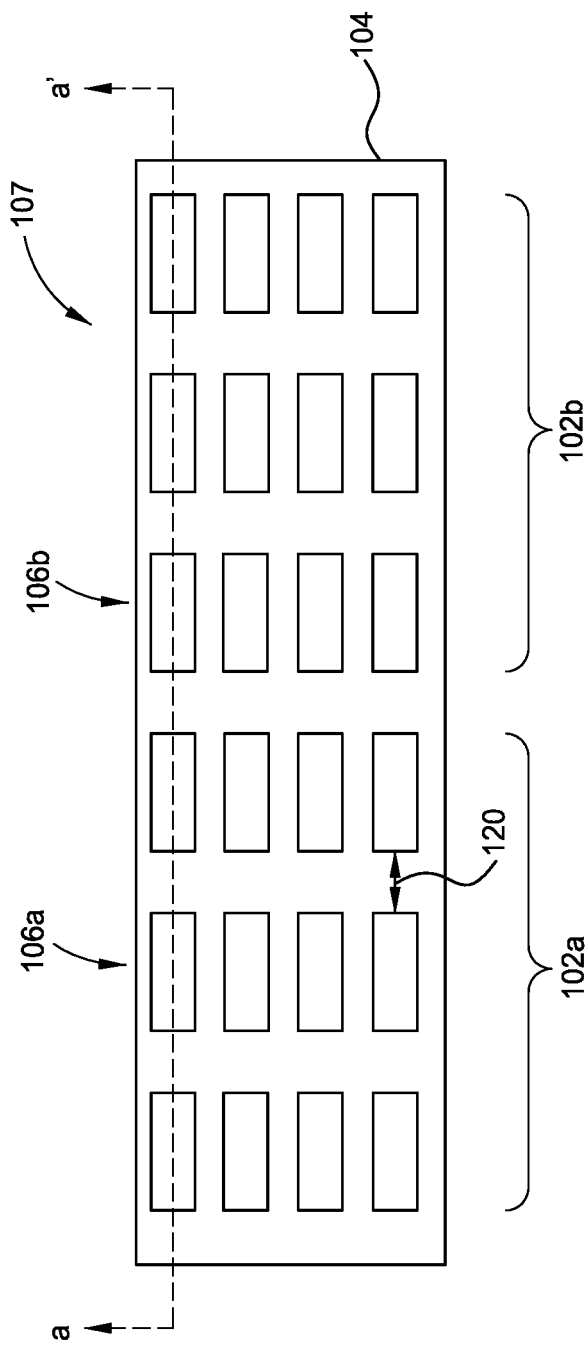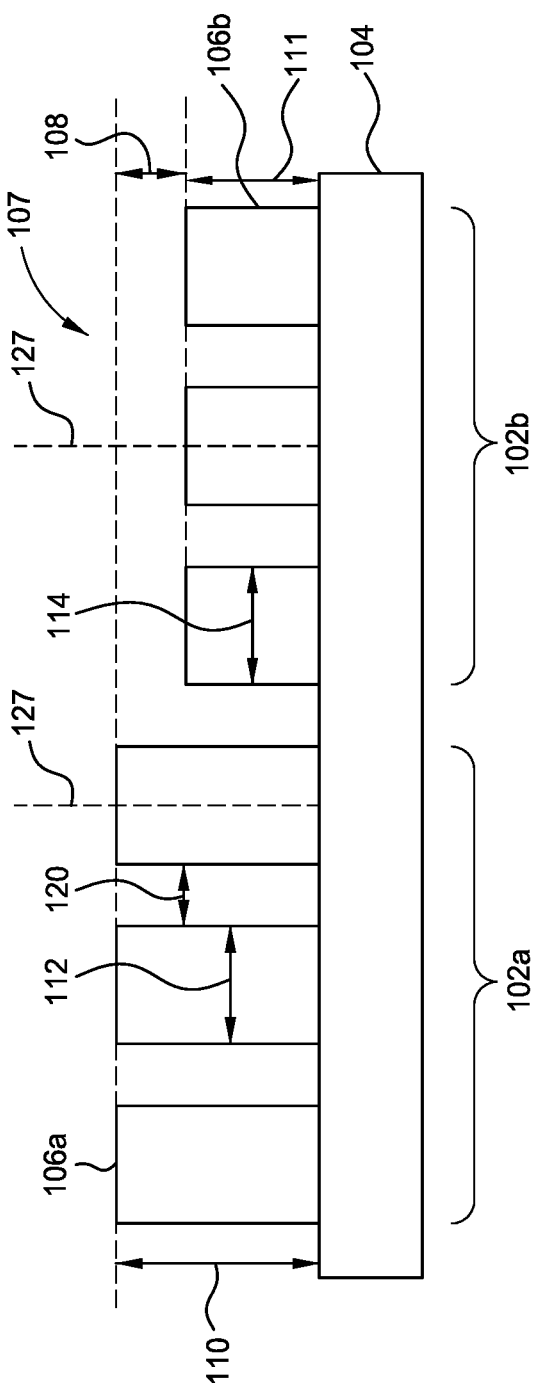

NANOSTRUCTURES FOR OPTICAL DEVICES

CROSS-REFERENCE TO RELATED APPLICATIONS

This application is a continuation of U.S. Non-Provisional patent application Ser. No. 16/601,006, filed Oct. 14, 2019, which claims benefit of U.S. Provisional Application Ser. No. 62/771,952 filed Nov. 27, 2018, each of which are herein incorporated by reference in its entirety.

BACKGROUND

Field

The embodiments of the disclosure generally relate to nanostructures with desired geometric profiles and methods of fabricating the same for optical devices.

Description of the Related Art

Metasurfaces can be used to form optical components or optical devices. Metasurfaces can improve performances of optical devices and facilitate the creation of entirely new functionalities. In particular, metasurfaces are 2D optical elements that can be used to manipulate the propagation of light by spatially varying structural parameters of the constituent nanostructrues (e.g., shape, size, orientation) to provide a spatially varying optical response that molds optical wavefronts as desired. These optical elements alter light propagation by inducing localized phase discontinuities (i.e., abrupt changes of phase over a distance smaller than the wavelength of the light). These optical elements may be composed of different types of materials, shapes, or configurations and may operate based upon different physical principles.

Thus, for various optical devices or metasurfaces utilizing nanostructures, the nanostructures with different materials, profiles, and configurations are often required to be developed in an attempt to meet different device performances for the optical devices. The nanostructures may enhance local electric field, absorption of lights, and radiation of the light of a material, which in turn can be utilized to enhance optical signals, or provide optimal optical functionality employed for different optical devices. However, these are challenging processes to form the nano-scale structures with the desired profile cost-effectively while maintaining maximum optical performance and properties suitable of the intended optical devices.

Thus, there remains a need for methods of forming nanostructure with desired optical performance for optical devices.

SUMMARY

Embodiments of metasurfaces having nanostructures with desired geometric profiles and configurations are provided in the present disclosure. In one embodiment, a metasurface includes a nanostructure formed on a substrate, wherein the nanostructure is cuboidal or cylindrical in shape.

In another embodiment, a metasurface includes a plurality of nanostructures on a substrate, wherein each of the nanostructures has a gap greater than 35 nm spaced apart from each other.

In yet another embodiment, a metasurface includes a plurality of nanostructures on a substrate, wherein the nanostructures are fabricated from at least one of titanium dioxide, silicon nitride, amorphous silicon, crystalline silicon, gallium nitride and aluminum zinc oxide with refractive index greater than 1.8, and absorption coefficient smaller than 0.001.

BRIEF DESCRIPTION OF THE DRAWINGS

So that the manner in which the above-recited features of the present disclosure can be understood in detail, a more particular description of the disclosure, briefly summarized above, may be had by reference to implementations, some of which are illustrated in the appended drawings. It is to be noted, however, that the appended drawings illustrate only typical implementations of this disclosure and are therefore not to be considered limiting of its scope, for the disclosure may admit to other equally effective implementations.

FIG. 1A is top view of nanostructures formed on a substrate according to embodiments of the present disclosure.

FIG. 1B is cross sectional view of nanostructures of FIG. 1A according to embodiments of the present disclosure.

Identical reference numerals have been used, where possible, to designate identical elements that are common to the figures. It is contemplated that elements disclosed in one implementation may be beneficially utilized in other implementations without specific recitation.

DETAILED DESCRIPTION

Optical metasurfaces are diffractive thin structures that can modify the amplitude, phase, and polarization of light beams for various applications. In one embodiment, a metasurface includes a plurality of nanostructures with different geometric profiles or configurations formed on a substrate are provided in the present disclosure. The nanostructures may be used as optical elements in optical devices. The optical metasurafces described herein consist of dielectric nanostructures with subwavelength lateral dimension, and thicknesses comaparable to the wavelength of light. The nanostructures, or metasurfaces, provide a value of transmission amplitude close to 1 for the light transmitting therethrough. The nanostructures (or metasurfaces) can provide different values of phase covering the range between 0 and $2\pi$. In the present disclosure, reference may be made to the visible light to UV light spectrum or possibly outside the visible light spectrum. Suitable examples of the optical devices include optical lens, solar cell devices, display applications, charge-coupled devices (CCD), complementary metal-oxide semiconductor (CMOS) image sensors, light-emitting diodes (LED), a micro-LED (uLED) display, or vertical-cavity surface-emitting laser (VCSELs), color filters, beam deflectors, holograms, or other suitable optical devices. In some example, the optical elements discussed herein can be independent optical elements, interactive optical elements, flat optical elements and material properties of the interlayer designed to enhance performance. Nano-imprint lithography may also be employed to imprint a pattern of features directly on to a substrate, subsequently depositing, which may include inkjet, slot-die, spin-coating, or otherwise forming the inter-element or optical element as needed. The shapes designed to form the nanostructures discussed herein range from something as simple as rectangles or circular configurations to arbitrary very complex shapes. Suitable examples of high index transparent materials, such as $TiO_2$, or other dielectric materials, such as silicon nitride, amorphous silicon, crystalline silicon, gallium phosphide, gallium nitride, zinc oxide, aluminum zinc oxide and the like as needed. The nanostructures, or metasurfaces, provide a value of transmission amplitude close to 1 for the light transmitting therethrough.

Figure 1C:
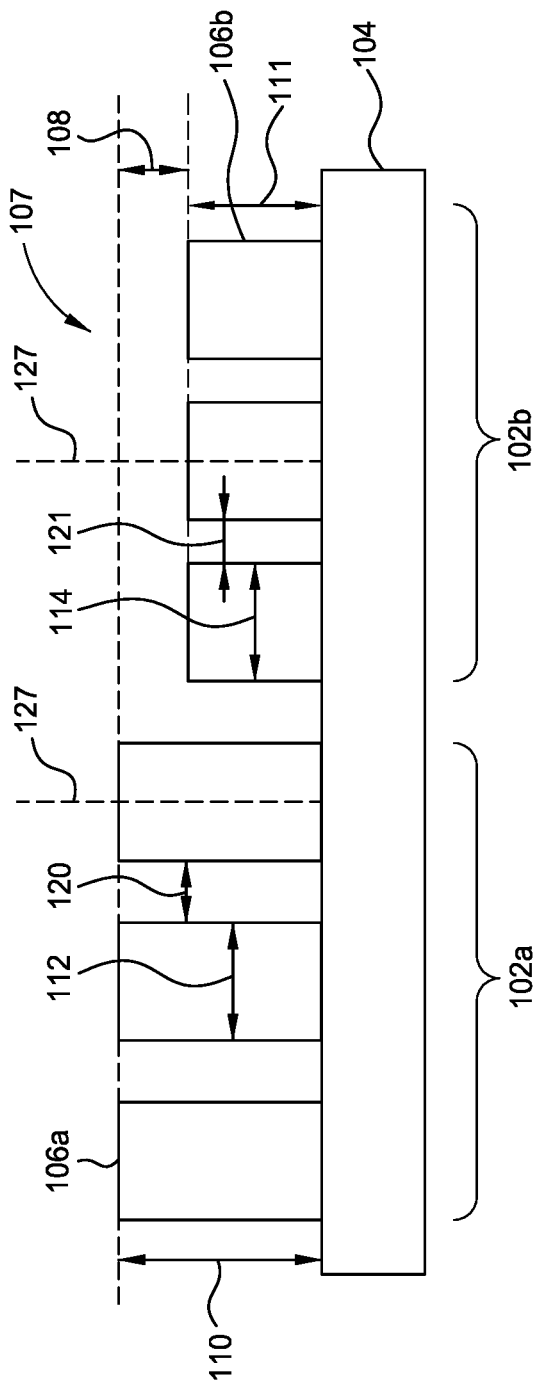
FIG. 1C is cross sectional view of another example of nanostructures of FIG. 1A according to embodiments of the present disclosure.

FIG. 1A is a top view of a metasurface 107 according to one embodiment of the present disclosure. The metasurface 107 comprises a plurality of nanostructures (shown as 106a, 106b) on a substrate 104. In general, the nanostructures (shown as 106a, 106b) are in the form of nanoscale features that are formed on (e.g. directly or indirectly on) or are integral with a surface of substrate 104. Nanostructures 106a, 106b can be substantially homogeneous in material properties. However, in some embodiments, the nanostructures 106a, 106b can be heterogeneous. Nanostructures can be substantially crystalline, monocrystalline, polycrystalline, amorphous or a combination thereof. In one example, each of the dimensions of the nanostructures 106a, 106b has a dimension of less than about 1000 nm, for example, less than about 500 nm, less than about 200 nm, less than about 100 nm or even less than about 20 nm.

The substrate 104 may have a substantially planar surface. A "substantially planar surface", as defined herein, usually refers to a substantially flat surface. The surface can be smooth, although it may include a relatively minor degree (e.g., about 20% of the total surface area) of texture (e.g., roughness), indentations, and various such as like bendable and/or stretchable. Moreover, in some embodiments, the surface of the substrate may be curved as needed.

The substrate 104 may also be selected to transmit a suitable amount of light of a desired wavelength or wavelength range, such as one or more wavelengths in the infrared region to UV region (i.e., from about 700 to about 1500 nanometers). Without limitation, in some embodiments, the substrate 104 is configured such that the substrate 104 transmits greater than or equal to about 50%, 60%, 70%, 80%, 90%, 95%, 99%, to UV region of the light spectrum. The substrate 104 may be formed from any suitable material, provided that the substrate 104 can adequately transmit light in a desired wavelength or wavelength range and can serve as an adequate support for the metasurfaces. In some embodiments, the material of substrate 104 has a refractive index that is relatively low, as compared to the refractive index of materials used in the nanostructures 106a, 106b. Substrate selection may include substrates of any suitable material, including, but not limited to, semiconductor, doped semiconductor, amorphous dielectrics, crystalline dielectrics, silicon oxide, polymers, and combinations thereof. In some embodiments, the substrate 104 includes a transparent material. The substrate 104 is transparent with absorption coefficient smaller than 0.001. Suitable examples may include an oxide, sulfide, phosphide, telluride or combinations thereof. In one example, the substrate 104 comprises silicon oxide material.

The plurality of nanostructures 106a, 106b comprise a first group 102a of nanostructures 106a and a second group 102b of nanostructures 106b. The nanostructures 106a, 106b descried herein are generally configured to impart a phase change to light incident thereon. The substrate 104 generally functions to support the nanostructures 106a, 106b and other materials or structures disposed thereon. The first group 102a of nanostructures 106a may have dimensions, material properties or profile configurations different from the second group 102b of nanostructures 106b, which will be described in greater detail below with reference to FIG. 1B. The nanostructures 106a, 106b may have different or the same refractive index in the first and the second groups 102a, 102b to meet different optical performance for the metasurface 107. The optical properties of nanostructures 106a, 106b can be determined by their sizes, dimension, and chemical or surface compositions. Various properties of the nanostructures 106a, 106b, such as absorption properties, emission properties and refractive index properties, can be utilized to create an antireflection coating that can be tailored and adjusted for various optical applications as needed. In one example, each of the plurality of nanostructures 106a, 106b may control characteristics of transmission or reflection of light and a phase of light input to the metasurface 107. Each of the plurality of nanostructures 106a, 106b may each have refractive index in a desired range with the desired reflective characteristics. In some examples, each of the plurality of nanostructures 106a, 106b may each have a predetermined dimension, such as a height, radius, or width, which provides the desired light characteristics.

In one example, the metasurface 107 has an array or arrays of nanostructures 106a, 106b each having a primary axis 127 (as shown in FIG. 1B). The primary axis 127 is substantially perpendicular to the surface of the substrate 104. The array or arrays of nanostructures 106a, 106b may be characterized by graded or non-graded refractive index as needed. The graded refractive index may be defined as a continuous or nearly continuous variation in the refractive index of the nanostructures 106a, 106b in a direction (along the primary axis 127) as needed. However, in some examples, the nanostructures 106a, 106b may have uniform refractive index (e.g., non-graded refractive index) across the body of the nanostructures 106a, 106b. The nanostructures 106a, 106b may be arranged in a random fashion or in a periodic fashion on the surface of the substrate 104 as needed.

FIG. 1B is cross sectional view of nanostructures 106a, 106b along the cut line a-a' of FIG. 1A according to one embodiment of the present disclosure. The primary axis 127 of the nanostructures 106a, 106b is perpendicular to the surface of the substrate 104. The first group 102a of nanostructures 106a may have a first width 112 while the second group 102b of the nanostructures 106b may have a second width 114. The first width 112 may be the same as or different from the second width 114. In the example depicted in FIGS. 1A and 1B, the first width 112 is substantially the same as the second width 114 having a range between about 60 nm and about 300 nm. Furthermore, the first group 102a of nanostructures 106a may have a first height 110 while the second group 102b of the nanostructures 106b may have a second height 111. Similarly, the second height 111 may be the same, shorter, or higher than the first height 110. In the example depicted in FIG. 1B, the second height 111 is shorter and has a height difference 108 to the first height 110. In one example, the first height 110 is between about 10% and 30% higher than the second height 111. In one example, the second height 111 has the height difference 108 between about 10 nm and about 1000 nm to the first height 110. The first height 110 and the second height 11 are in a range between about 100 nm and about 5000 nm.

In one example, the nanostructures 106a, 106b can be in variety of shapes. In one embodiment, the nanostructures are cuboidal in shape. FIG. 1B schematically illustrates an array of cuboidal nanostructures 106a, 106b. The term "cuboidal" mentioned herewith generally refers to the geometrical definition of the term. A cuboid is a convex polyhedron bounded by six quadrilateral, square or rectangular faces at right angles to each other. In one example depicted herein, the nanostructures 106a, 106b are cuboidal in shape having a square top surface and a square base surface bounded by four rectangular sides (e.g., lateral surfaces). The primary axis 127 of the nanostructures 106a, 106b is a straight line passing a center point of the square top surface and the square base surface, about which the lateral surface has a rotational symmetry. The cuboidal nanostructure usually has a continuously uniform (e.g., equal) cross-sectional area (e.g., equal lateral dimension) along the primary axis 127. Thus, the uniform cross-sectional area of the nanostructures 106a, 106b produces a general similar effective refractive index along the primary axis 127 of the nanostructure 106a, 106b.

In one embodiment the nanostructures 106a, 106b are placed on a square lattice with equal pitch. Pitch is defined as the center to center distance between any two closest neighbors of the nanostructures 106a, 106b measured along the primary axis 127. The nanostructures 106a, 106b may also be arranged on a square lattice with equal distance between the edges of the two closest neighbors of the nanostructures 106a, 106b.

The nanostructures 106a, 106b may also be arranged on a hexagonal lattice, or arbitrarily on the substrate 104. In the meanwhile, the width 112, 114 of the nanostructures 106a, 106b and a gap 120 between the nanostructures 106a, 106b remain subwavelength for the wavelength range considered. The nanostructures 106a, 106b are made of materials with refractive index greater than 1.8 and absorption coefficient smaller than 0.01, such as less than 0.001.

In one embodiment, the nanostructures 106a, 106b has a square lattice structure having a refractive index greater than 1.8, and absorption coefficient smaller than 0.1, such as smaller than 0.01, such as less than 0.001.

In one example, the nanostructures 106a, 106b may have a graded effective refractive index formed by altering the shapes or profiles of the nanostructures 106a, 106b along the primary axis 127. For examples, the nanostructures 106a, 106b may have varying cross-sectional area (e.g., varying lateral dimension) along the primary axis 127 so as to obtain a varying effective refractive index as needed. Alternatively, the nanostructure 106a, 106b may have varying (e.g., graded) compositions or material properties along the primary axis 127 so that the varying (e.g., graded) compositions or material properties of the nanostructures 106a, 106b provide the varying refractive index. In other words, the refractive index changes due to the change in compositions or material properties of the nanostructures. The "varying compositions" as defined herein refers to a gradual variation in the composition in one direction, although the gradation may not be always constant.

In one example, the nanostructures 106a, 106b may be substantially transparent structures. The term "substantially transparent", according to the present disclosure, means that the nanostructures allow the passage of a substantial portion of light radiation. The substantial portion may be at least about 70% of the light radiation. "Substantially perpendicular", according to the present invention, means that the primary axis is inclined at an angle in a range of from about 90 degrees to about 75 degrees, relative to the surface of the substrate 104.

The nanostructure 106a, 106b may have a predetermined gap 120 equally or non-equally spaced from each other. In one example, the nanostructure 106a, 106b may be arranged periodically on the surface of the substrate 104 with the predetermined gap 120 between about 1 nm and about 500 nm, such as between about 10 nm and about 150 nm, for example between about 45 nm and about 280 nm. The nanostructures 106a, 106b may also be arranged on a square lattice with the predetermined gap 120 with equal distance between the edges of the two closest neighbors of the nanostructures 106a, 106b. The nanostructures 106a, 106b may also be arranged on a hexagonal lattice, or arbitrarily on the substrate 104. In the meanwhile, the width 112, 114 of the nanostructures 106a, 106b and the gap 120 between the nanostructures 106a, 106b remain subwavelength for the wavelength range considered. The substantially uniform cross-sectional area of the nanostructures 106a, 106b is characterized by sub-wavelength scattering phenomenon that provide relatively low reflectance. Thus, the low reflectance benefited from the uniform cross-sectional area of the nanostructures 106a, 106b may efficiently reduce the scattering effect or other undesired effect occurred due to the overly closely spaced nanostructures 106a, 106b. Thus, by utilizing the substantially uniform cross-sectional area of the nanostructures 106a, 106b with desired heights and geometric configurations, a relatively larger gap 120 between the nanostructures 106a, 106b is permitted. The gap 120 is maintained equal to or less than a wavelength of a light source passing therethrough the nanostructures 106a, 106b. In the example depicted in FIG. 1B, the gap 120 between the nanostructures 106a, 106b is between about 15 nm and about 100, for example between about 40 nm and about 60 nm. In yet another example, the gap 120 between the nanostructures 106a, 106b is at least greater than 35 nm, for example between about 40 nm and about 60 nm. Thus, in other words, the nanostructures 106a, 106b of the substantially uniform cross-sectional areas may behave as sub-wavelength scattering objects, which provide large forward scattering, and subsequent transmission of light through the underlying substrate 104.

In one example, when the nanostructure 106a, 106b has a relatively higher height, such as greater than 600 nm, a relatively large gap 120 may be formed between the nanostructures 106a, 106b. In this example depicted in FIG. 1C, the gap 120 defined in the first group 102a of the nanostructures 106a with the higher height 110 may be larger than a gap 121 defined in the second group 102b of the nanostructures 106b with the lower height 111. In another example, when the height 110 of the nanostructure 106a, is changed from about 600 nm to about 850 nm, the gap 120 may be controlled from about 55 nm to about 100 nm. In one example, when the nanostructure 106a, 106b has a relatively higher refractive index, a relatively large gap 120 between the nanostructures 106a, 106b and lower aspect ratio of the nanostructures 106a, 106b may be formed. Furthermore, relatively taller (e.g., higher height 110, 111) nanostructures 106a, 106b also allows a relatively large gap 120 between the nanostructures 106a, 106b.

In one example, the nanostructures 106a, 106b include metal containing dielectric materials, such as titanium dioxide ($TiO_2$), zinc oxide, tin oxide, aluminum doped zinc oxide, fluorine-doped tin oxide, cadmium stannate (tin oxide), and zinc stannate (tin oxide) or the like. In another embodiment, the nanostructures 106a, 106b comprises a non-conductive non-crystalline material, such as a dielectric material. Suitable examples of the dielectric material include silicon nitride, amorphous silicon and the like. In one particular example, the nanostructures 106a, 106b is fabricated by titanium dioxide ($TiO_2$), silicon nitride, amorphous silicon, GaN and aluminum zinc oxide.

In one example, the nanostructures 106a, 106b has a refractive index in a range greater than 1.8, such as between about 2.3 and about 2.6 under the light wavelength of 632 nm or 532 nm. For example, the nanostructures 106a, 106b have a refractive index between about 2.4 and 2.55, such as about 2.4 or 2.53. In one example, the nanostructures 106a, 106b has absorption coefficient smaller than 0.001.

Figure 2A:
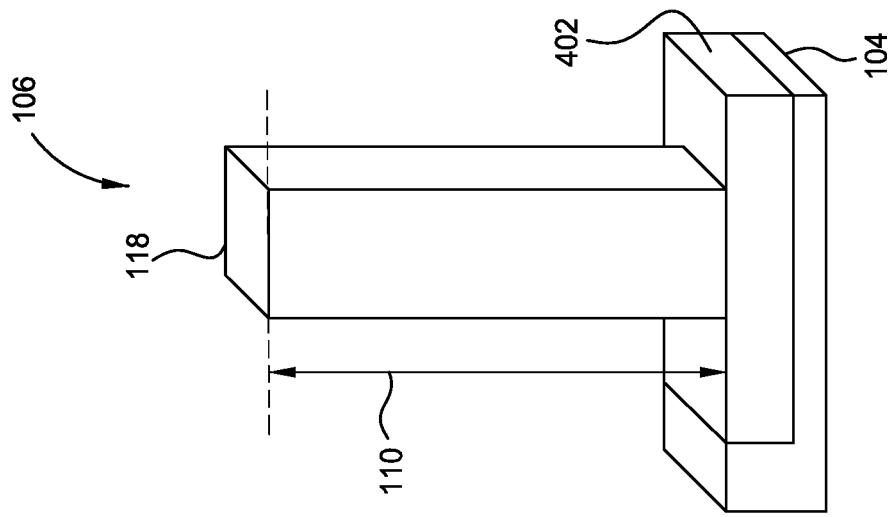
FIGS. 2A-2B are perspective views of different examples of nanostructures with different profiles according to embodiments of the present disclosure.

FIG. 2A depicts a perspective view of the nanostructure 106a according to embodiments of the present disclosure. The nanostructure 106a may have an aspect ratio greater than 3, for example greater than 5, such as greater than 6, such as about 8.5. The phrase "aspect ratio", according to the present disclosure, means a ratio (H/W) of the height (H) 110 to the width (W) 118 of a top surface or bottom surface of the nanostructure 106a. The aspect ratio and shape of the nanostructure 106a may be predetermined so as to select a proper manufacturing process to form or grow such nanostructures. In the embodiment depicted in FIG. 2A, the nanostructure 106a has an aspect ratio greater than 6. The height 110 is between about 200 nm and about 850 nm, such as about 600 nm. The width 118 is between about 70 nm and about 260 nm. The nanostructure 106a is cuboidal in shape.

Figure 2B:
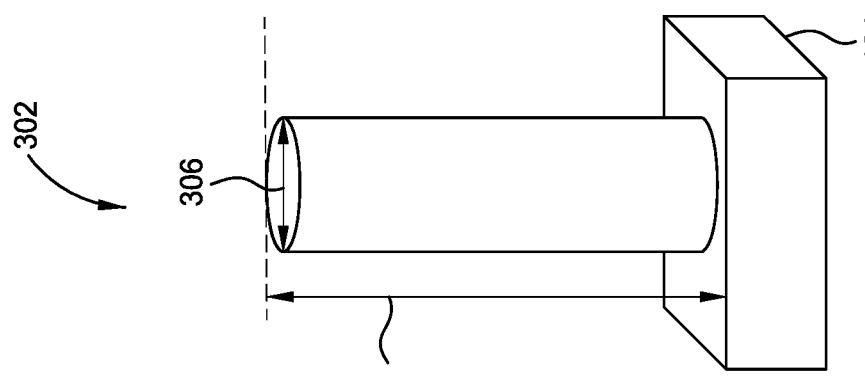

FIG. 2B depicts a perspective view of another example of a nanostructure 202 according to embodiments of the present disclosure. The nanostructure 202 has a substantial similar profiles and shape (e.g., cuboidal in shape) to the nanostructure 106 depicted in FIG. 2A except the corner configuration. The nanostructure 202 has substantially round corners 204 formed on the top and bottom surfaces of the nanostructure 202. The optical properties of the nanostructures 202 are believed to be similar to those of the nanostructures 106a, 106b. It is noted that the round corners 204 from the nanostructures 202 with cuboidal in shape have similar good performance to the nanostructures 202 with circular in shape. The nanostructures 202 with cuboidal in shape has a relatively large gap therebetween, as compared to the nanostructures 202 with circular in shape.

Figure 3:
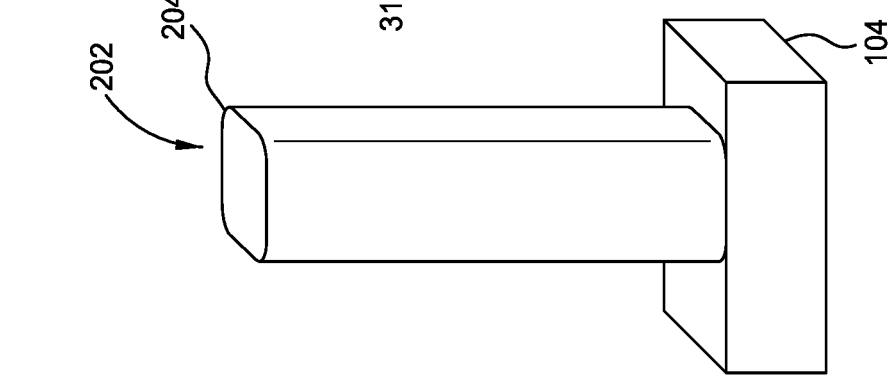
FIG. 3 is a perspective view of another example of a nanostructure according to embodiments of the present disclosure.

FIG. 3 depicts a perspective view of another example of a nanostructure 302 according to embodiments of the present disclosure. Unlike the cuboidal shape depicted in FIG. 2A-2B, the nanostructure 302 has a circular configuration and generally in cylindrical in shape. The nanostructure 302 has a top and bottom surface in circular configuration having a dimeter 306 at a range between about 70 nm and about 260 nm. The nanostructure 302 has a height 314 between about 300 nm and about 900 nm, such as about 600 nm. The nanostructure 302 has an aspect ratio (e.g., a ratio (H/D) of the height (H) 314 to the diameter 306) greater than 3, such as between about 3 and about 12, for example between about 4 and 9, such as about 6.

Figure 4:
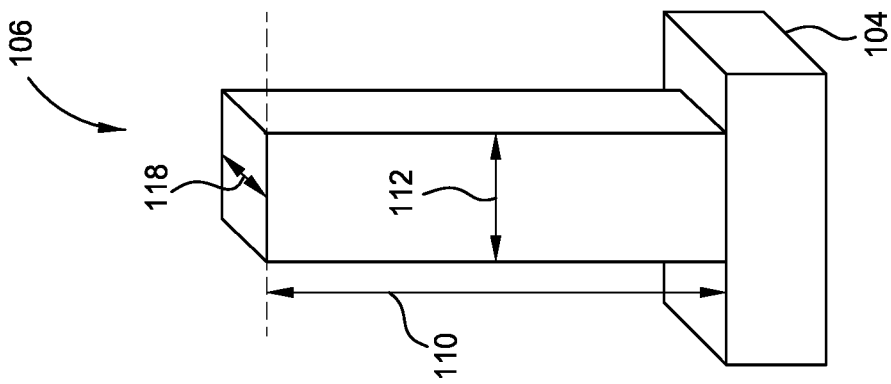
FIG. 4 is a perspective view of yet another example of a nanostructure according to embodiments of the present disclosure.

FIG. 4 depicts a perspective view of an example of the nanostructure 106a according to embodiments of the present disclosure. In this example, an additional structure 402 may be disposed between the substrate 104 and the nanostructure 106a. It is noted that the nanostructures in the example of FIG. 4 may be any suitable nanostructures, such as the nanostructures 106a, 106b, 303 302 depicted above. In one example, the structure 402 may be manufactured from a material similar to the nanostructures 106a formed thereon and/or to the substrate 104 disposed thereby. In one example, the structure 402 may include the substantially the same material from the nanostructures 106a or from the substrate 104. In one example, the structure 402 may be one of titanium dioxide, silicon nitride, amorphous silicon, crystalline silicon, gallium nitride and aluminum zinc oxide.

Figure 5:
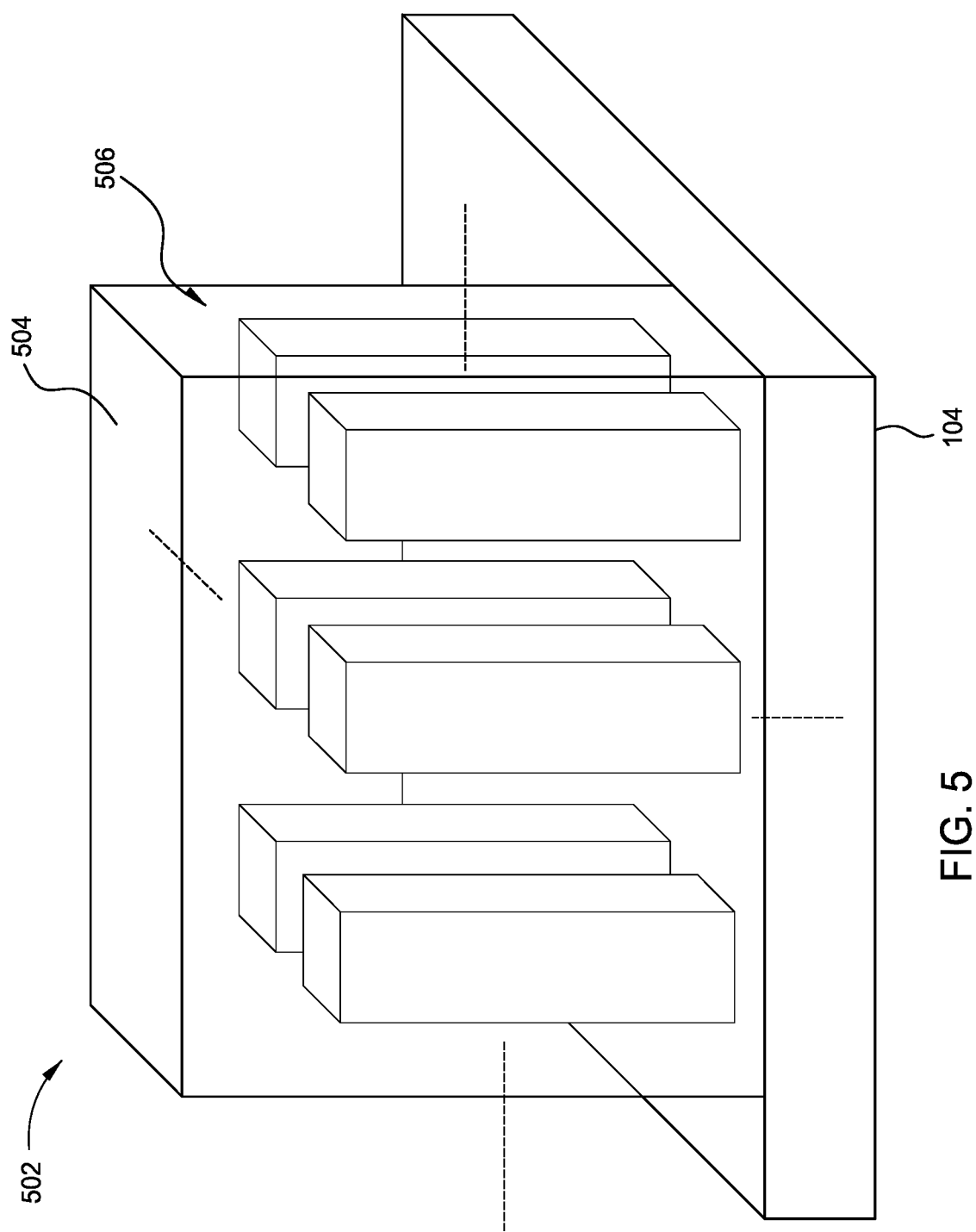
FIG. 5 is a perspective view of yet another example of nanostructures formed in an encapsulation structure according to embodiments of the present disclosure.

FIG. 5 depict yet another embodiment of a metasurface 502 having a plurality of nanostructures 506 encapsulated under an encapsulating layer 504. The encapsulating layer 504 may be used when the nanostructures has a relative higher height, such as greater than 900 nm. In some examples where multiple stacked structures are utilized, the encapsulating layer 504 as described herein may assist packing and stacking up the structures disposed thereabove as needed. In one example, the encapsulating layer 504 may be a dielectric material or a conductive layer. The encapsulating layer 504 is often used when the nanostructures has a relative higher height (e.g., or larger aspect ratio). It is noted that when the nanostructures has a relatively lower height, the material selected to fabricate the encapsulating layer 504 has also to be of relatively lower refractive index.

It is noted that the metasurfaces where the nanostructures from the present disclosure may be utilized refers to devices that either produce light or use light in their operation. The nanostructures may also be utilized in nanoimprinting structures in semiconductor applications. In some embodiments, the optical devices may be a photodiode, a light emitting diode, a photovoltaic device, or a semiconductor laser. These optical devices can be used in variety of applications. Examples of applications include a display, a photo detector, lens, filters, general lights, cameras, display applications, fiber-optic communications or suitable flat optical elements.

Thus, embodiments of nanostructures with different configurations and different materials are provided. The nanostructures may have certain profiles that can enhance the light absorption or reflection performance in the optical device wherein the nanostructures are implemented in. With proper selection of the materials and geometric configurations of the nanostructures, gap between the nanostructures may also be enlarged so as to lower the manufacturing constraint and complexity.

Although various embodiments which incorporate the teachings of the present invention have been shown and described in detail herein, those skilled in the art can readily devise many other varied embodiments that still incorporate these teachings.

The invention claimed is:

1. A device, comprising:
an array of nanostructures formed on a substrate, wherein each nanostructure of the array of nanostructures is spaced away from each other with a gap therebetween, wherein the gap is greater than 10 nm, wherein a first length of the gap defined in a first group of nanostructures is greater than a second length of the gap defined in a second group of nanostructures, wherein a first height of the first group of nanostructures corresponds to the first length of the gap and the first height of the first group of nanostructures is greater than a second height of the second group of nanostructures.

2. The device of claim 1, wherein the device is a metasurface.

3. The device of claim 2, wherein the gap is between about 55 nm to about 100 nm.

4. The device of claim 3, wherein the nanostructures in the array of nanostructures comprises a dielectric material and have a height greater than 600 nm.

5. The device of claim 4, wherein the dielectric material is at least one of titanium dioxide, silicon nitride, amorphous silicon, crystalline silicon, gallium nitride, and aluminum zinc oxide.

6. The device of claim 2, wherein the nanostructures in the array of nanostructures have different lateral dimensions.

7. The device of claim 2, wherein the nanostructures in the array of nanostructures have a uniform lateral dimension.

8. The device of claim 2, wherein the gap is greater than 35 nm.

9. The device of claim 1, further comprising:
an encapsulating layer encapsulating the array of nanostructures.

10. The device of claim 9, wherein the array of nanostructures has a relative height greater than 900 nm.

11. The device of claim 1, wherein the nanostructures of the array of nanostructures have a refractive index greater than 1.8 and an absorption coefficient smaller than 0.001.

12. The device of claim 1, wherein the array of the nanostructures provide all possible values of transmission phase between 0 and $2\pi$.

13. The device of claim 1, wherein the array of the nanostructures provide a value of transmission amplitude close to 1.

14. A device, comprising:
an array of nanostructures formed on a substrate, wherein each nanostructure of the array of nanostructures is spaced away from each other with a gap therebetween, wherein the gap is greater than 10 nm, wherein a first length of the gap defined in a first group of nanostructures is greater than a second length of the gap defined in a second group of nanostructures, wherein the first group of the nanostructures has a higher refractive index than the second group of nanostructures.

15. A device, comprising:
a plurality of nanostructures on a substrate, wherein each of the nanostructures is spaced from other nanostructures by a gap greater than 10 nm, wherein the gap defined in a first group of nanostructures of the plurality of nanostructures is greater than the gap defined in a second group of nanostructures of the plurality of nanostructures, the first group of nanostructures having a higher refractive index than the second group of nanostructures.

16. The device of claim 15, wherein the plurality of nanostructures are cuboidal or cylindrical in shape.

17. The device of claim 15, wherein the plurality of nanostructures have refractive index greater than 1.8.

18. The device of claim 15, wherein the plurality of nanostructures are fabricated from at least one of titanium dioxide, silicon nitride, amorphous silicon, crystalline silicon, gallium nitride and aluminum zinc oxide.

19. A device, comprising:
a plurality of nanostructures on a substrate, wherein the plurality of nanostructures are fabricated from at least one of $TiO_2$, silicon nitride, amorphous silicon, GaN, aluminum zinc oxide or any material with refractive index greater than 1.8, and an absorption coefficient smaller than 0.001, the substrate is transparent with absorption coefficient smaller than 0.001, and wherein a gap defined in a first group of nanostructures of the plurality of nanostructures is greater than the gap defined in a second group of nanostructures of the plurality of nanostructures, the first group of nanostructures having a higher refractive index than the second group of nanostructures.

* * * * *